(12) United States Patent
Kuijstermans et al.

(10) Patent No.: US 7,403,749 B2
(45) Date of Patent: Jul. 22, 2008

(54) METHOD AND SYSTEM FOR INTEGRATED CIRCUIT RF IMMUNITY ENHANCEMENT

(75) Inventors: Frank Kuijstermans, Leiderdorp (NL); Gerrit Dijkstra, Pijnacker (NL)

(73) Assignee: National Semiconductor Corporation, Santa Clara, CA (US)

( * ) Notice: Subject to any disclaimer, the term of this patent is extended or adjusted under 35 U.S.C. 154(b) by 569 days.

(21) Appl. No.: 11/179,739

(22) Filed: Jul. 11, 2005

(65) Prior Publication Data

US 2007/0010214 A1 Jan. 11, 2007

(51) Int. Cl.
*H04B 17/00* (2006.01)
*H04Q 7/20* (2006.01)

(52) U.S. Cl. .............. 455/114.2; 455/67.11; 455/67.13; 455/425

(58) Field of Classification Search .............. 455/67.11, 455/67.14, 115.1, 115.2, 226.3, 333, 114.2, 455/278.1, 296, 63.1, 424, 425, 67.13, 114.1; 702/58, 64, 65, 115, 116, 190, 191, 195; 324/750, 612, 613, 619; 438/14, 17, 57
See application file for complete search history.

(56) References Cited

U.S. PATENT DOCUMENTS

| | | | | |
|---|---|---|---|---|
| 5,337,261 A | * | 8/1994 | Rogers | 702/190 |
| 6,121,778 A | * | 9/2000 | Moore | 324/619 |
| 6,154,710 A | * | 11/2000 | Kobayashi et al. | 702/65 |
| 6,237,126 B1 | * | 5/2001 | Bonitz | 716/4 |
| 6,326,793 B1 | * | 12/2001 | Moore | 324/615 |
| 6,593,826 B2 | | 7/2003 | See | 331/179 |
| 6,754,598 B2 | * | 6/2004 | Shimazaki et al. | 702/70 |
| 7,039,572 B1 | * | 5/2006 | Narahara et al. | 703/14 |
| 7,120,551 B2 | * | 10/2006 | Hirano et al. | 702/117 |
| 7,222,033 B1 | * | 5/2007 | Newson et al. | 702/65 |
| 7,278,124 B2 | * | 10/2007 | Shimazaki et al. | 716/5 |
| 2001/0017575 A1 | | 8/2001 | See | 331/117 |

OTHER PUBLICATIONS

K. Armstrong; "Analogue circuit design for RF immunity", *Australian Electronics Engineering*, 2002, p. 1-4.

Coenen, M.J., "CAD EMC-design in microelectronics (finding the right balance)", *Proceedings of 10th International Zurich Symposium on Electromagnetic Compatibility*, Mar. 1993, p. 6B1/25-8.

Crovetti, P.S.; Fiori, F., "Design of a CMOS opamp input stage immune to EMI", *International Journal of Electronics*, 2003, vol. 90, No. 2, p. 99-108.

F. Fiori et al.; "Nonlinear effects of RF interference in MOS operational amplifiers", IEEE 2001, p. 201-204.

Fiori, F., "Experimental evaluation of IC susceptibility to RFI", *Compliance Engineering*, Mar./Apr. 2001, p. 62+64-65.

(Continued)

*Primary Examiner*—Sonny Trinh
(74) *Attorney, Agent, or Firm*—Merchant & Gould PC

(57) ABSTRACT

Method and system for enhancing RF immunity of integrated circuits (ICs). Susceptibility of different subcircuits within the IC is determined by simulation or bench testing. Relatively simple filters are implemented based on the susceptible frequency range and circuit parameters such as impedance. Filter(s) may be integrated into the IC avoiding PCB level redesign. Susceptibility determination and mitigation method may be applied to new IC designs or existing ICs without major redesign.

20 Claims, 6 Drawing Sheets

OTHER PUBLICATIONS

Fiori, F., "Integrated circuits immunity evaluation by different test procedures", *International Conference on Computational Electromagnetics and its Applications*, 1999, p. 286-9.

Fiori, F., "ICs susceptibility: a critical assessment of the test procedures", *Fifteenth International Wroclaw Symposium and Exhibition*, 2000, p. 41-4.

Franc, F., "EMI filter packaging [chip scale packaging]", *Advanced Packaging*, Jul. 2002, 7 pgs.

Boris Traa; "RF-susceptibility analysis of complex integrated analog circuits", *IEEE International Symposium on Electromagnetic Compatibility*, 2002; pp. 987-992.

Kyechong Kim et al.; "Study of the Effects of Microwave Interference on MOSFET Devices in CMOS Integrated Circuits"; Semiconductor Device Research Symposium, 2003 International; pp. 530-531.

N. L. Whyman et al.; "Modeling RF Interference effects in Integrated Circuits"; Electromagnetic Compatibility, 2001; EMC 2001 IEEE International Symposium on, vol. 2, pp. 1203-1208.

Franco Fiori et al.; "Investigation of VLSI's Input Ports Susceptibility to Conducted RF Interference"; Electromagnetic Compatibility, 1997; IEEE 1997 International Symposium; pp. 326-329.

F. Fiori; "Operational amplifier input stage robust to EMI"; 2001; Electronics Letters, vol. 37, pp. 930-931.

J. Gago et al.; "Instruments Offset Due to RF EMI"; Industrial Electronics Society, 2003; IECON '03 The 29th Annual Conference of the IEEE; vol. 3, pp. 2488-2493.

* cited by examiner

[ original amplifier IC ]

[ amplifier IC with enhanced RF immunity ]

METHOD AND SYSTEM FOR INTEGRATED CIRCUIT RF IMMUNITY ENHANCEMENT

TECHNICAL FIELD

The present invention relates to integrated circuits, and more particularly, to methods and systems for enhancing Radio Frequency (RF) immunity of integrated circuits (ICs).

BACKGROUND

Electronic technology is used virtually everywhere. Coffee pots, wrist-watches, automobiles, cash registers, personal computers, telephones, and thousands of other types of common electronic equipment are used by people at any time of the day. While electronic devices provide outstanding convenience and benefit to today's society, they also have the potential to interfere with radio communications and other electronic devices.

Electronic devices by their very nature generate radiated and conducted noise. Electromagnetic Interference (EMI) is often a result of non-ideal passive component behavior combined with timing signals. For example, a resistor acts at high frequencies like a circuit comprising a series combination of an inductance and a resistor in parallel to a capacitor, while an inductor acts at high frequencies like an inductor in parallel with a capacitor, and the like. Electronic devices may also include many electrical and mechanical components that can act as unintentional coupling mechanisms. These coupling mechanisms provide signal paths for noise generated by other devices which affect sensitive circuitry. This may lead to interruption of operation or degraded performance of an electronic device or system.

Because the negative impacts of EMI such as interruption of computing device operations, communications, and emergency services are a major concern, intentional and unintentional generation of electromagnetic noise, as well as susceptibility of electronic devices to EMI are regulated by governmental entities in many countries.

BRIEF DESCRIPTION OF THE DRAWINGS

Non-limiting and non-exhaustive embodiments are described with reference to the following drawings.

DETAILED DESCRIPTION

Figure 1:
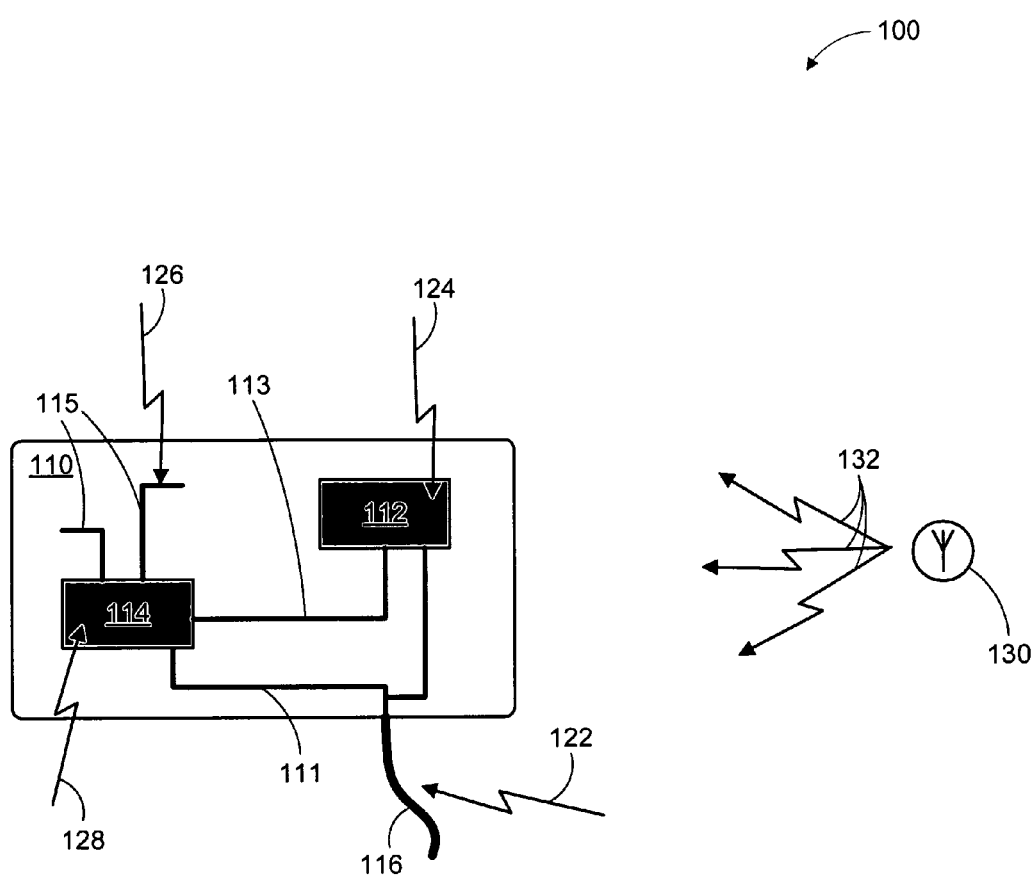
FIG. 1 is a system illustrating various pathways of EMI between different electronic devices.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" may mean a direct electrical, electromagnetic, mechanical, logical, or other connection between the items connected, without any electrical, mechanical, logical or other intermediary there between. The term "coupled" can mean a direct connection between items, an indirect connection through one or more intermediaries, or communication between items in a manner that may not constitute a connection. The term "circuit" can mean a single component or a plurality of components, active and/or passive, discrete or integrated, that are coupled together to provide a desired function. The term "signal" can mean at least one current, voltage, charge, data, or other such identifiable quantity Briefly stated, the present disclosure generally relates to a method and system for enhancing RF immunity of integrated circuits (ICs). Susceptibility of different subcircuits within the IC is determined by simulation or bench testing. Relatively simple filters are implemented based on the susceptible frequency range and circuit parameters such as impedance. Filter(s) may be integrated into the IC avoiding PCB level redesign. Susceptibility determination and mitigation method may be applied to new IC designs or existing ICs without major redesign.

Embodiments of the present invention provide a method of determining susceptibility of different subcircuits within the IC to EMI. Methods for enhancing the RF immunity of those subcircuits with relatively simple filters are also provided enabling overall improvement of the IC functionality without expensive redesign or considerable enlargement of the die.

According to one embodiment, an example amplifier is enhanced with EMI filtering at input and output pathways. While embodiments are presented on particular example circuits, the invention is not so limited. Aspects may be applied to circuits known in the art. Similarly, filtering techniques in addition to those presented may be implemented without departing from a scope and spirit of the invention.

Illustrative Operating Environments

Figure 2:
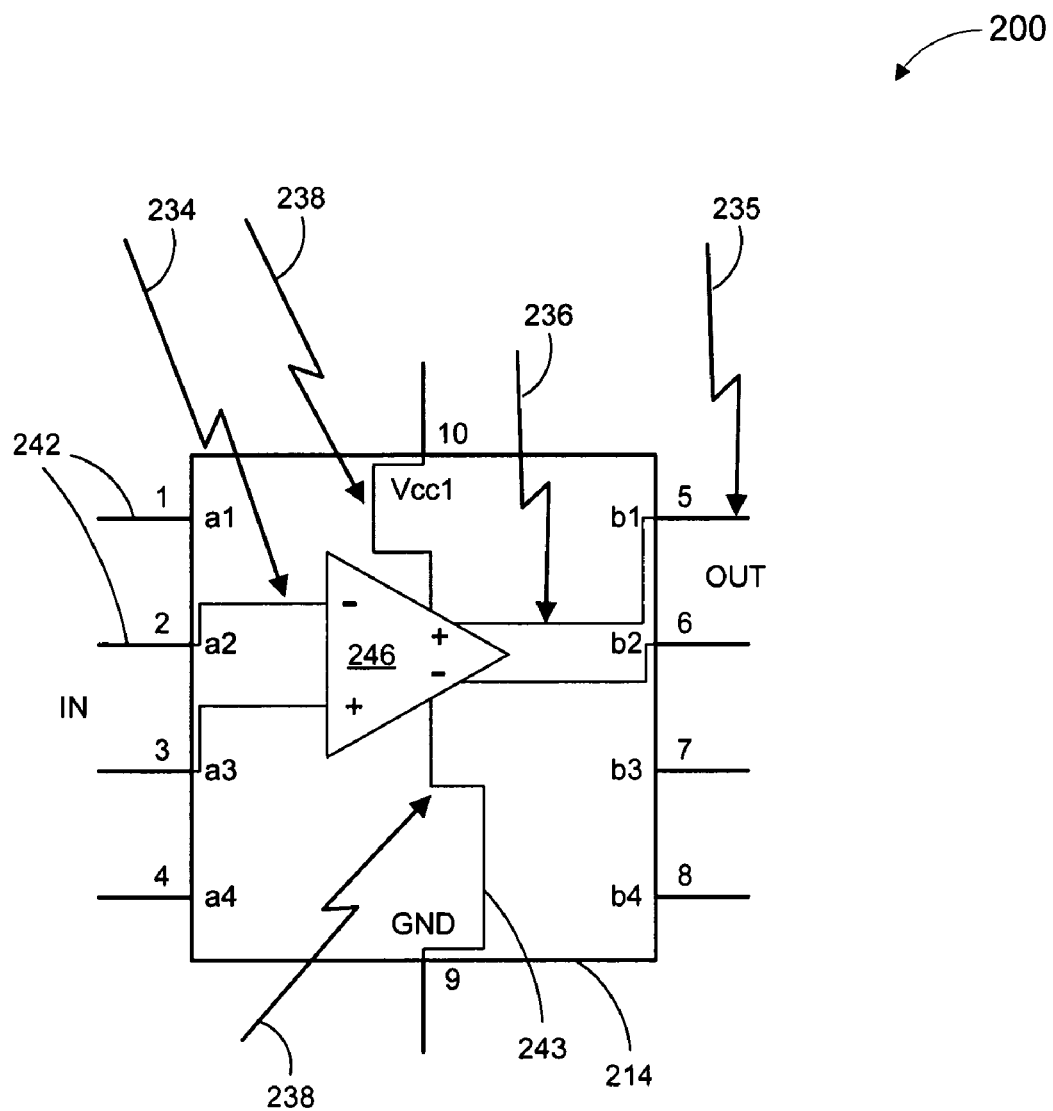
FIG. 2 illustrates various pathways of EMI affecting an example integrated circuit.

FIGS. 1 and 2 illustrate example environments where at least one embodiment of an RF immunity enhancing circuit may be implemented according to the present disclosure.

Electromagnetic Compatibility (EMC) is the ability of an electronic device to coexist in its intended electromagnetic environment without causing or suffering functional degradation or damage. Electronic devices both generate and are subject to EMI in their operating environment. EMI is a process by which disruptive electromagnetic energy is transmitted from one device to another via radiated and/or conducted pathways. In common usage, the term refers particularly to RF signals, but EMI can occur in a much broader frequency spectrum.

RF energy is transmitted through two basic modes: Radiated Emissions (RE) and Conducted Emissions (CE). RE are the component of RF energy that is transmitted through a non-conductive medium as an electromagnetic field. RE generally go through free space, but other transmission modes may also occur. CE are the component of RF energy that is transmitted through a conductive medium, such as interconnect cables, as an electromagnetic field.

The term RF immunity refers to a relative measure of a device or system's ability to withstand EMI exposure via either pathway. Conversely, RF susceptibility refers to a relative measure of a device or system's inability to withstand EMI exposure via either pathway.

Referring to FIG. 1, system 100 illustrates various pathways of EMI between different electronic devices. System 100 represents any electronic device operating in proximity to a radiated electromagnetic noise source.

System 100 includes radiated electromagnetic noise 132 generated by EMI source 130, and target electronic device 110. EMI source 130 may be an intentional transmitter or an unintentional transmitter generating noise during its intended operation. Electronic device 110 may be a fully enclosed device or system, a distributed modular device or system, or an electronic subassembly, such as a circuit board. In one embodiment, electronic device 110 may include IC's 112 and 114 on the same circuit board. IC's 112 and 114 may be any type of integrated circuit including, but not limited to, amplifiers, processors, memories, logic devices, and the like. IC's 112 and 114 may be coupled together through traces such as traces 111 and 113 on the circuit board. Each IC may be further coupled to other components on the circuit board through additional traces such as traces 115, which are coupled to IC 114.

Moreover, IC's 112 and 114 may be coupled to other devices and systems through a connection point on the circuit board. For example, communication signals, power signals, and the like, may be provided to the circuit board through a cable such as cable 116. Trace 111 and others like it may provide communication between the IC's and the cable.

FIG. 1 also shows example EMI coupling pathways to IC 114. Such pathways include:
(1) radiated coupling 122 of EMI to cable 116, followed by conducted transmission to IC 114 through trace 111;
(2) direct radiated coupling 128 of EMI onto IC 114;
(3) radiated coupling 126 of EMI onto traces 115, followed by conducted transmission to IC 114; and
(4) radiated coupling 124 of EMI onto IC 112, followed by conducted transmission to IC 114.

These example coupling pathways are provided for illustration purposes and do not constitute a limitation to the embodiments of the present disclosure. It is be noted, that in a complex electronic device many other ways of EMI coupling is possible including combinations of the above described pathways.

FIG. 2 shows example amplifier device 200 with various pathways of EMI affecting the device. Amplifier device 200 includes integrated circuit 214. Integrated circuit 214 includes amplifier circuit 246. Inverting and non-inverting inputs of amplifier circuit 246 are coupled to pins 2 and 3 of integrated circuit 214. Outputs of amplifier circuit 246 are coupled to pins 5 and 6 of integrated circuit 214. High and low supply voltages are provided to amplifier circuit 246 through supply voltage pins (9 and 10) of integrated circuit 214.

FIG. 2 further shows example EMI coupling pathways to integrated circuit 214. Example EMI coupling pathways include:
(1) radiated coupling 242 through the pins of the integrated circuit;
(2) radiated coupling 234 through the traces within integrated circuit 214 on the input side of amplifier circuit 246;
(3) radiated coupling 236 through the traces within integrated circuit 214 on the output side of amplifier circuit 246;
(4) radiated coupling 235 through the wires outside amplifier circuit 246 to the output side of amplifier circuit 246; and
(5) radiated coupling 238 through the supply voltage traces (e.g. ground trace 243) within integrated circuit 214.

As mentioned in FIG. 1, other coupling mechanisms such as conducted coupling through the pins of integrated circuit 214 may further complicate RF immunity status of amplifier device 200.

General Discussion of Example Systems

In digital devices, increasing data rates and microprocessor clock frequencies cause the environment inside electronic equipment to become more and more hostile in terms of EMI. Analog circuits are generally designed to perform well within a desired signal bandwidth, which is often far lower than frequencies of RF interference signals. However, coupling of high frequency RF signals into analog circuits and a subsequent transformation of these signals into the information signal frequency range may degrade a performance of such circuits.

As mentioned previously, RF signals are either picked up within the circuit itself or outside the circuit and brought in through the connecting wires. By integrating a circuit into an IC the wires ("unintentional antennas") are reduced in size, minimizing an amount of RF pick-up within the circuit. The amount of RF signals coupling through the pins may be reduced at the printed circuit board (PCB) level by shielding and off-chip filters. Another approach is to use differential wiring, so that the intentionally communicated signals are differential mode and the unwanted RF signals only affect the common mode. The coupled unwanted RF signals can then be reduced by common mode filtering. Many of these mitigation methods require costly and time-consuming redesign or additional complex components at PCB or IC level.

According to embodiments of the present disclosure, RF susceptibility may be reduced by identifying sensitive subcircuits such as inputs or outputs of functional blocks within an IC and implementing relatively simple filtering techniques to those components while leaving the transfer of signals essentially unaffected. The filtering may then be integrated into the IC resulting in less action to be taken at the PCB level to avoid EMI problems.

Figure 3A:
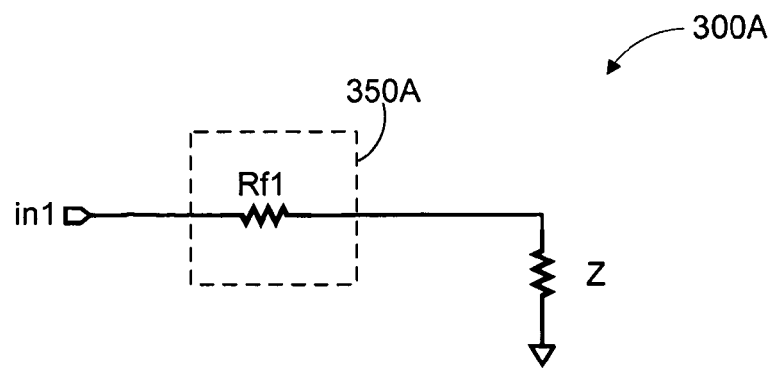
FIGS. 3A, 3B, and 3C schematically illustrate different filters that may be employed to enhance RF immunity at an input of an IC.
Figure 3B:
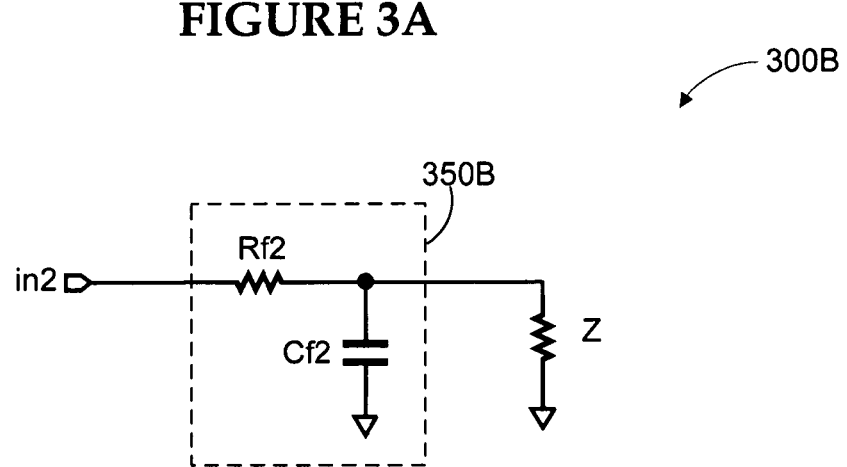
Figure 3C:
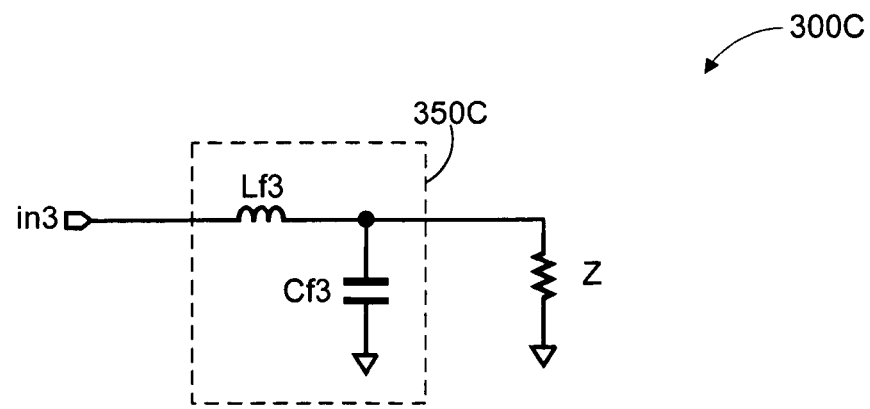

FIGS. 3A, 3B, and 3C schematically illustrate example input circuits 300A, 300B, and 300C, which include low pass filters 350A, 350B, and 350C for enhancing RF immunity of an IC.

Input impedance of the circuit to be protected is represented by impedance Z. Each of circuits 300A, 300B, and 300C include a different type of filter, R, RC, and LC, respectively. Circuit 300A is a resistive filter (350A) with resistor circuit Rf1. Circuit 300B includes an RC filter (350B) comprising resistor circuit RF2 and capacitor circuit Cf2. Circuit 300C includes LC filter 350C comprising inductive circuit Lf3 and capacitive circuit Cf3. Resistive components of each filter circuit provide impedance matching to an input impedance of the subcircuit to which the filter is to be implemented. The input impedance of the subcircuit, which is at the same time a load of the filter is designated by Z in the figure. Each filter circuit has different frequency transfer characteristics.

Through simulation or bench testing of an existing IC, a sensitive frequency range of a circuit may first be determined. Then, an appropriate filter circuit such as one of the circuits 300A, 300B, and 300C may be selected to be coupled to the input circuit. This way, noise in the sensitive frequency range may be prevented from coupling into the target circuit through the input.

While three types of filters are shown for illustration purposes, other filters may be implemented for RF immunity enhancement. Such filters include, but are not limited to, passive and active filters, low-pass, band-pass, high-pass, all-pass filters, notch or inverse-notch filters, Chebychev or Butterworth filters, 1st order, 2nd order, Nth order filters, and the like.

Figure 4A:
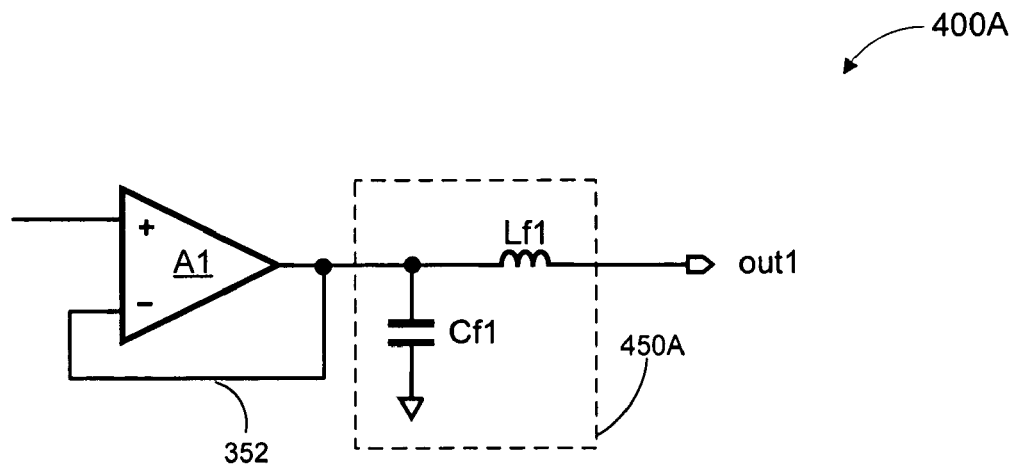
FIGS. 4A and 4B schematically illustrate two different filters that may be employed to enhance RF immunity at an output of an IC.
Figure 4B:
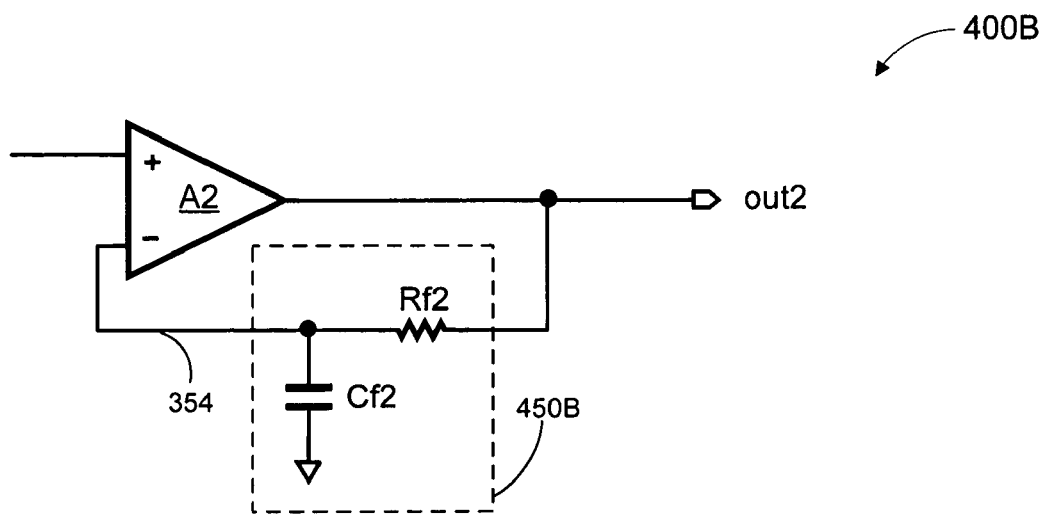

FIGS. 4A and 4B schematically illustrate circuits 400A and 400B implementing two different filters 450A and 450B, which may be employed to enhance RF immunity of an output of example amplifiers A1 and A2.

An output of a circuit may include unwanted RF signals that may be generated within the circuit. Unwanted RF signals may also be coupled through the input of the circuit and amplified by the circuit. To prevent such RF signals from affecting other circuits coupled to the output, filtering may be implemented. Furthermore, RF signals may couple to the output of a circuit and cause performance degradation by affecting output circuitry or affecting the next stage within the device.

Similar to the process described in FIG. 3, a frequency range of unwanted RF signals at the output may be determined by simulation or bench testing. Following the evaluation, appropriate output filtering such as LC filter 450A comprising inductive circuit Lf1 and capacitive circuit Cf1 placed at the output of amplifier A1, or RC filter 450B comprising resistive circuit Rf2 and capacitive circuit Cf2 placed in the feedback loop of amplifier A2 may be implemented.

Figure 5A:
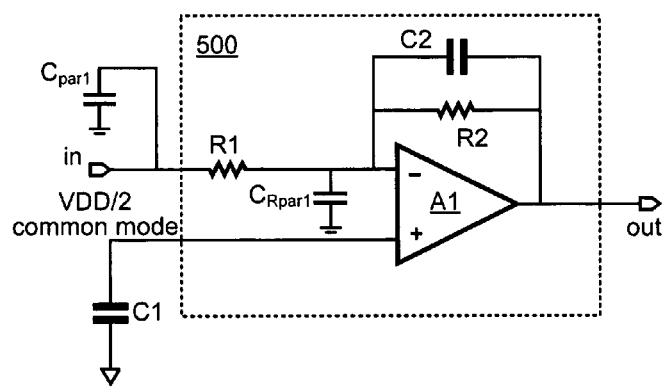
FIGS. 5A and 5B schematically illustrate an example amplifier circuit and an enhanced version of the same amplifier circuit with filtering resistors in different locations.
Figure 5B:
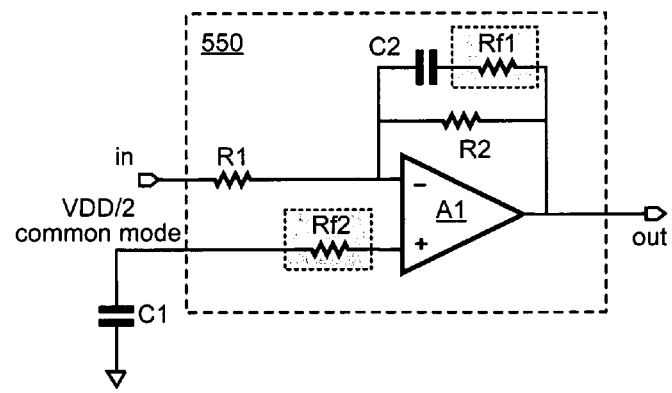

FIGS. 5A and 5B schematically illustrate example amplifier circuit 500 and enhanced amplifier circuit 550 with filtering resistors implemented at different locations.

Amplifier circuit 500 is an amplifier implemented in an electronic device such as in a cellular phone or a laptop PC, and affected by the RF signals transmitted by the electronic device as described previously. A repetition rate of an unwanted high frequency signal, for example at 217 Hz, can be demodulated and become present at the amplifier output.

Amplifier circuit 500 of FIG. 5A includes amplifier block A1. Sensitive subcircuits of this circuit may be the input of amplifier block A1. RF signals may be present on all IC pins, such as input pin in, output pin out, supply pins and the VDD/2 common mode pin. Simulation and/or bench testing results may indicate that the amplifier is most sensitive to RF signals at the common mode pin and at the output.

Low sensitivity to RF signals at the input in may be due to the presence of resistor RI. As a result of the parasitic capacitances of the input resistors, the RF signals are filtered before they reach the actual sensitive subcircuits. RF signal at the VDD/2 common mode pin may result in a demodulated signal mainly at the output.

FIG. 5A further includes input parasitic capacitor Cpar1, as well as input resistor parasitic capacitor CRpar1. While parasitic capacitances are distributed throughout the circuit and the discrete components, they are typically modeled as discrete capacitors. Therefore they are represented as discrete capacitors in the illustrated circuit. For simplicity purposes, the parasitic capacitors associated with other components in the circuit are not shown.

FIG. 5B shows RF immunity enhanced amplifier circuit 550 with additional filtering resistors Rf1 and Rf2. Resistor Rf2 is added to the original design to make amplifier block A1 more immune to RF signals at the common mode pin. The feedback path for amplifier block A1 includes capacitor C2 to provide stability. This capacitor, however, provides a path for RF signals from the output of amplifier block A1 to the input of the amplifier block. Since the amplifier input is generally high impedance, relatively large resistor Rf1 may be connected in series to provide sufficient RF filtering. For simplicity purposes, the parasitic capacitors are not shown in amplifier circuit 550 of FIG. 5B.

Example Calculations For Amplifier Circuit 550

Amplifier block A1 generally has a high input impedance within the signal band, typically much higher than 1 mega ohms. When biasing amplifier block A1 through filtering resistor Rf2, the bias voltage is not exactly at VDD/2 anymore, limiting a maximum swing of the amplifier. Assuming 1 mega ohms DC input impedance, the bias voltage may change about 1% for Rf2=10 kilo ohms. Rf2 (10 k) together with the parasitic capacitance at the input of amplifier block A1 (due to large input transistors) forms a low pass filter with a cutoff frequency of approximately 30 MHz.

In one example, capacitor C2 may have capacitance value of 8 pF. The capacitor may be coupled in parallel with the feedback resistor R2 (20 kilo ohms) to ensure stability of the amplifier. The capacitor and the feedback resistor form a pole at a frequency of approximately 1 MHz. The capacitor C2 may also have a parasitic capacitance to ground of approximately 1 pF. With Rf1 selected to have resistance value of 1 kilo ohms, a low pass filter is formed with a cutoff frequency of approximately 100 MHz. Filtering resistor Rf1 is placed in series with capacitor C2 to form a zero at 20 MHz. The zero is sufficiently far away from the 1 MHz pole to hardly affect the stability of the amplifier, leaving adequate phase and gain margin.

The component values provided above are for illustration purposes only and do not constitute a limitation on embodiments of the present invention. Other component values as well as additional or fewer components may be implemented without departing from a scope or spirit of the invention.

Figure 6:
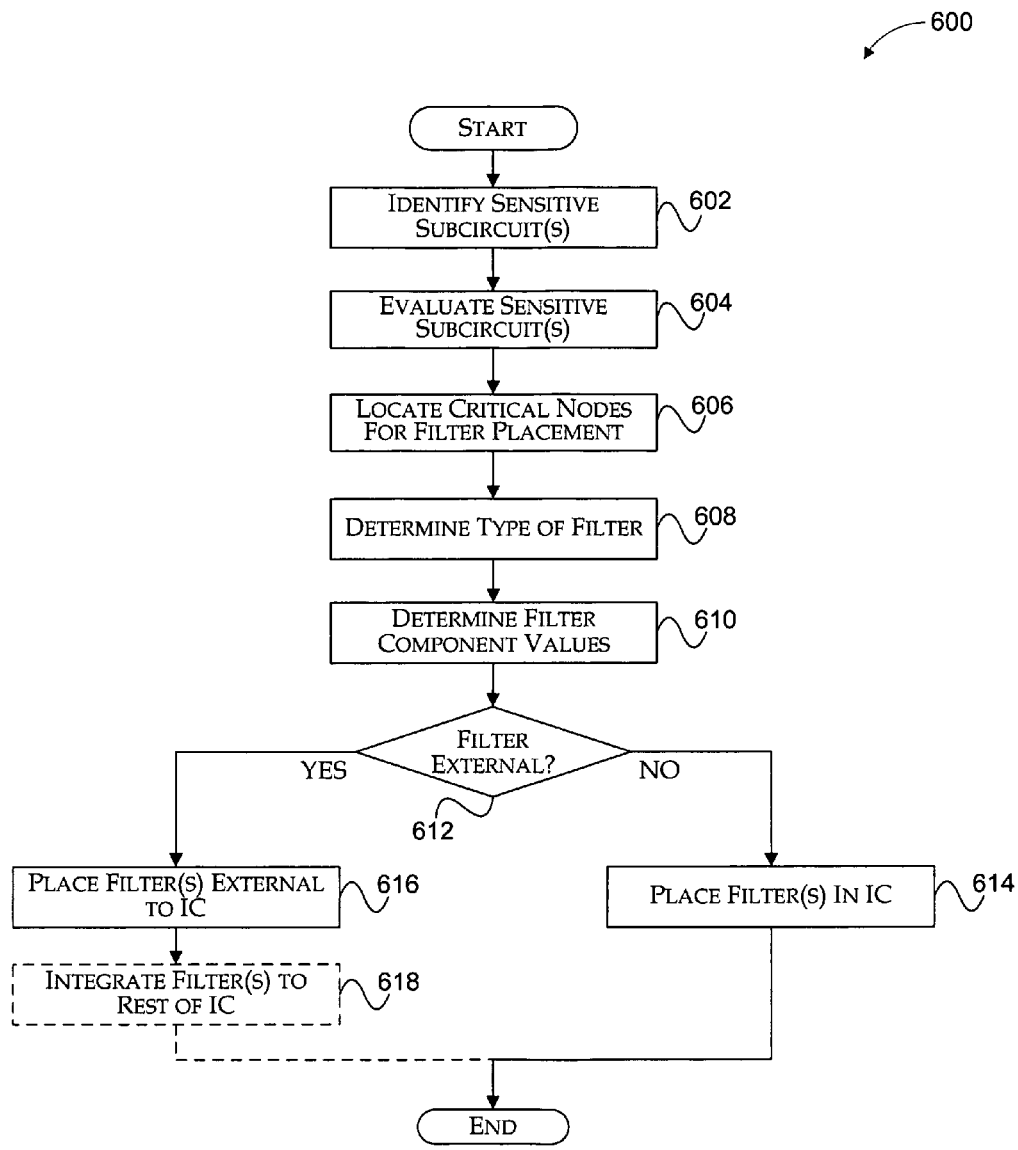
FIG. 6 is a flow diagram illustrating a process for enhancing the RF immunity of an IC employing low pass filters according to one embodiment.

FIG. 6 is a flow diagram illustrating process 600 for enhancing the RF immunity of an IC employing low pass filters according to one embodiment.

Process 600 begins at block 602, where sensitive subcircuits of an IC are identified. In one embodiment, sensitive subcircuits of an IC may be identified by simulation that takes into account a wide spectrum of RF signals at various points of the circuitry such as inputs, outputs, and the like. Processing then proceeds to block 604.

At block 604, the sensitive subcircuits are evaluated. Sensitive subcircuits may be evaluated by further simulation or, in another embodiment, by bench testing.

Bench testing may include injecting RF signals with frequency and amplitude similar to those expected in the actual operating environment to various connection points of the circuitry such as amplifier inputs, outputs, bias voltage connections, and the like. While the RF signals are injected, an operation of the IC may be monitored for degradation. In another embodiment, the device may be subjected to various levels of electromagnetic fields while its performance is monitored. Processing moves from block 604 to block 606.

At block 606, critical nodes are located for filter placement. Critical nodes of sensitive subcircuits may be selected based on increases in functional degradation of the IC. Once sensitive circuits are established, their RF immunity may be enhanced in more than one way. Enhancement options may include filtering at the input, at the output, or in other places. Considering operational parameters of the circuit, critical nodes for placement of the filters may be selected based on a criterion that combines RF immunity improvement with functional limitation. For example, adding a filter to an output may cause some degradation of output amplitude while improving signal bandwidth performance.

In a further embodiment, additional considerations such as power consumption, circuit layout, and the like, may also be included in the filter placement decision. Processing advances from block 606 to block 608.

At block 608, filter type(s) are determined. Depending on the location of the filter (input, output, etc.) and the frequency range of the unwanted RF signal, different filter types, such as those shown in FIG. 3, may be implemented. In another embodiment, other filters may be implemented for RF immunity enhancement. Such filters include, but are not limited to, passive and active filters, low-pass, band-pass, high-pass, all-pass filters, notch or inverse-notch filters, Chebychev or Butterworth filters, 1st order, 2nd order, Nth order filters, and the like. Next, processing proceeds to block 610.

At block 610, values of the components of the selected filter(s) are determined based on a type and a desired frequency range of the filter, and impedance of the circuit, where the filter is to be implemented. Processing moves to decision block 612 from block 610.

At decision block 612, a determination is made whether the filter is to be implemented external to the IC. If the decision is negative, processing moves to block 614.

At block 614, the filter(s) is placed into the circuit. In case of integrated filter(s), the circuit may be redesigned to include the filter(s) and manufactured as an IC.

If the filter(s) is to be placed external to the IC, processing advances from decision block 612 to block 616, where the filtering components are placed, externally to the IC, on a PCB. In one embodiment, the filter(s) may be integrated later into the IC as shown in following optional block 618.

Actions described by various blocks of the above described flowchart are illustrative of various embodiments and do not represent a limitation of the present invention, which may be implemented in other ways including fewer blocks, more blocks, or other arrangements of the above described blocks.

Although the invention has been described herein by way of exemplary embodiments, variations in the structures and methods described herein may be made without departing from the spirit and scope of the invention. For example, the positioning of the various components may be varied. Individual components and arrangements of components may be substituted as known to the art. Since many embodiments of the invention can be made without departing from the spirit and scope of the invention, the invention is not limited except as by the appended claims.

What is claimed is:

1. A method for enhancing Radio Frequency (RF) immunity of an integrated circuit (IC), the method comprising:
   identifying at least one subcircuit within the IC that is sensitive to unwanted RF signals;
   determining a frequency range of the sensitivity of the at least one subcircuit;
   identifying at least one critical node where a filter is to be implemented;
   selecting at least one filter to mitigate the sensitivity of the at least one subcircuit in the determined frequency range; and
   implementing the at least one filter such that the at least one subcircuit has enhanced RF immunity in the determined frequency range.

2. The method of claim 1, further comprising integrating the at least one filter into the IC.

3. The method of claim 1, wherein identifying the at least one subcircuit within the IC includes performing an operational simulation of the IC in a presence of unwanted RF signals.

4. The method of claim 1, wherein identifying the at least one subcircuit within the IC includes testing a functional performance of the IC in a presence of unwanted RF signals.

5. The method of claim 4, wherein testing the functional performance of the IC in the presence of unwanted RF signals includes at least one of: injecting RF signals to predetermined nodes of circuits within the IC and subjecting to the IC to predetermined levels of electromagnetic fields.

6. The method of claim 1, wherein determining the frequency range of the sensitivity of the at least one subcircuit includes measuring a functional performance degradation of the IC in a presence of unwanted RF signals, and comparing a measurement result to a predetermined criterion.

7. The method of claim 1, wherein selecting the at least one filter to mitigate the sensitivity includes selecting a filter type based on the determined frequency range and other circuit parameters.

8. The method of claim 7, wherein selecting the at least one filter to mitigate the sensitivity further includes determining values of components of the selected filter based on the determined frequency range and the other circuit parameters.

9. The method of claim 7, wherein the filter type is at least one of a resistive (R) filter, a resistive-capacitive (RC) filter, and an inductive-capacitive (LC) filter.

10. The method of claim 7, wherein the other circuit parameters include at least one of: an input impedance, an output impedance, a voltage level, and a current level.

11. A system for enhancing RF immunity of an IC, the system comprising:
    a first module that is arranged to:
       identify at least one subcircuit within the IC that is sensitive to unwanted RF signals; and
       determine a frequency range of the sensitivity of the at least one subcircuit;
       identify at least one critical node where a filter is to be implemented; and
    a second module that is arranged to select at least one filter to mitigate the sensitivity of the at least one subcircuit in the determined frequency range.

12. The system of claim 11, further comprising:
    a third module that is arranged to implement the at least one filter such that the at least one subcircuit has enhanced RF immunity in the determined frequency range.

13. The system of claim 12, wherein the third module is arranged to implement the at least one filter by placing components onto a printed circuit board (PCB) that includes the IC.

14. The system of claim 12, wherein the third module is arranged to implement the at least one filter by digitally manipulating values of existing resistive, capacitive, and inductive components within the IC.

15. The system of claim 12, wherein the third module is arranged to implement the at least one filter by digitally manipulating values of existing resistive, capacitive, and inductive components on a PCB that includes the IC.

16. The system of claim 11, wherein the first module is arranged to identify the at least one sensitive subcircuit and the frequency range of sensitivity by performing an operational simulation of the IC in a presence of unwanted RF signals.

17. The system of claim 11, wherein the second module is arranged to select the at least one filter to mitigate the sensitivity by selecting a filter type from a group of filters based on the determined frequency range and other circuit parameters, wherein the group of filters includes at least one of a resistive (R) filter, a resistive-capacitive (RC) filter, and an inductive-capacitive (LC) filter.

18. The system of claim 17, wherein the second module is further arranged to determine values of components of the selected filter based on the determined frequency range and the other circuit parameters, wherein the other circuit parameters include at least one of: an input impedance, an output impedance, a voltage level, and a current level.

19. A system for mitigating RF susceptibility of an integrated circuit (IC), the system comprising:

a means for identifying at least one subcircuit within the IC that is sensitive to unwanted RF signals;

a means for determining a frequency range of the sensitivity of the at least one subcircuit;

a means for identifying at least one critical node where a filter is to be implemented;

a means for selecting at least one filter to mitigate the sensitivity of the at least one subcircuit in the determined frequency range; and a means for implementing the at least one filter such that the at least one subcircuit has enhanced RF immunity in the determined frequency range.

20. The system of claim 19, further comprising:

a means for integrating the at least one filter into the IC.

* * * * *